United States Patent [19]
Akhavan

[11] Patent Number: 5,920,815
[45] Date of Patent: Jul. 6, 1999

[54] PERSONAL PHONE NUMBER SYSTEM

[75] Inventor: Hamid Akhavan, Freehold, N.J.

[73] Assignee: Bell Atlantic Network Services, Inc., Arlington, Va.

[21] Appl. No.: 08/841,373

[22] Filed: Apr. 30, 1997

Related U.S. Application Data

[63] Continuation of application No. 08/321,675, Oct. 12, 1994, Pat. No. 5,673,308.

[51] Int. Cl.⁶ .................................................. H04Q 7/38
[52] U.S. Cl. ........................ 455/426; 455/417; 455/461; 455/552
[58] Field of Search .................................... 455/405, 414, 455/417, 422, 426, 445, 461, 552, 421, 561

[56] References Cited

U.S. PATENT DOCUMENTS

| | | |
|---|---|---|
| 4,178,476 | 12/1979 | Frost . |
| 4,191,860 | 3/1980 | Weber . |
| 4,313,035 | 1/1982 | Jordan et al. . |
| 4,562,572 | 12/1985 | Goldman et al. . |
| 4,611,094 | 9/1986 | Asmuth et al. . |
| 4,611,096 | 9/1986 | Asmuth et al. . |
| 4,654,879 | 3/1987 | Goldman et al. . |
| 4,658,416 | 4/1987 | Tanaka . |
| 4,680,785 | 7/1987 | Akiyama et al. . |
| 4,698,839 | 10/1987 | DeVaney et al. . |
| 4,745,632 | 5/1988 | Duffy . |
| 4,748,655 | 5/1988 | Thrower et al. . |
| 4,752,951 | 6/1988 | Konneker . |
| 4,756,020 | 7/1988 | Fodale . |
| 4,757,267 | 7/1988 | Riskin . |
| 4,775,997 | 10/1988 | West, Jr. et al. . |
| 4,788,718 | 11/1988 | McNabb et al. . |
| 4,852,148 | 7/1989 | Shibata et al. . |
| 4,852,156 | 7/1989 | Shigenaga . |
| 4,878,238 | 10/1989 | Rash et al. . |
| 4,878,243 | 10/1989 | Hashimoto . |
| 4,899,373 | 2/1990 | Lee et al. . |
| 4,901,340 | 2/1990 | Parker et al. . |
| 4,932,042 | 6/1990 | Baral et al. . |
| 4,980,907 | 12/1990 | Raith et al. . |
| 4,989,230 | 1/1991 | Gillig et al. . |
| 5,020,094 | 5/1991 | Rash et al. . |
| 5,025,254 | 6/1991 | Hess . |
| 5,040,177 | 8/1991 | Martin et al. . |

(List continued on next page.)

FOREIGN PATENT DOCUMENTS 2193861  2/1988  United Kingdom .

OTHER PUBLICATIONS

"EMX Elecronic Switching Equipment", Motorola (1984).
Wites, "Calling Party Pays".
Donogue et al., "The Building of Intelligent Network—Architecture and Systems for Alcatel", Communication & Transmission, (No. 2, 1989), pp. 5–22, published by Sotelec, Paris Franc.

*Primary Examiner*—Dwayne D. Bost
*Assistant Examiner*—William G. Trost
*Attorney, Agent, or Firm*—McDermott, Will & Emery

[57] ABSTRACT

A Personal Communication System (PCS) is operated using a Personal Phone Number (PPN) associated with each portable subscriber station within the system. Each portable subscriber station has an associated "home" cordless telephone base station associated therewith. When a particular portable subscriber station is within a range of its home base station, that base station controls the transmission of a cellular call forwarding request to a cellular telephone system servicing that area. The cellular telephone function of the portable subscriber station is deactivated, and all incoming calls addressed to that particular PPN are routed over a telephone landline connected to the associated cordless telephone base station servicing the portable subscriber station. Upon leaving the range of communication of the associated cordless telephone base station, the portable subscriber station reactivates its own cellular telephone function so that communication can be carried out with the cellular telephone system servicing that area.

14 Claims, 4 Drawing Sheets

U.S. PATENT DOCUMENTS

| | | |
|---|---|---|
| 5,090,050 | 2/1992 | Heffernan . |
| 5,090,051 | 2/1992 | Muppidi et al. . |
| 5,121,504 | 6/1992 | Toko ......................................... 455/90 |
| 5,127,042 | 6/1992 | Gillig et al. . |
| 5,142,654 | 8/1992 | Sonberg et al. . |
| 5,144,649 | 9/1992 | Zicker et al. . |
| 5,153,907 | 10/1992 | Pugh et al. . |
| 5,157,660 | 10/1992 | Kuwahara et al. . |
| 5,157,709 | 10/1992 | Ohteru . |
| 5,157,710 | 10/1992 | Itoh . |
| 5,179,721 | 1/1993 | Comroe et al. . |
| 5,197,092 | 3/1993 | Bamburak . |
| 5,210,785 | 5/1993 | Sato et al. . |
| 5,210,786 | 5/1993 | Itoh . |
| 5,210,787 | 5/1993 | Hayes et al. . |
| 5,212,684 | 5/1993 | MacNamee et al. . |
| 5,216,703 | 6/1993 | Roy . |
| 5,243,645 | 9/1993 | Bissell et al. . |
| 5,251,248 | 10/1993 | Tokunaga et al. . |
| 5,259,017 | 11/1993 | Langmantel . |
| 5,259,018 | 11/1993 | Grimmett et al. . |
| 5,260,987 | 11/1993 | Mauger . |
| 5,260,988 | 11/1993 | Schellinger et al. . |
| 5,272,747 | 12/1993 | Meade . |
| 5,303,287 | 4/1994 | Laborde . |
| 5,309,502 | 5/1994 | Hirai ........................................ 455/426 |
| 5,309,504 | 5/1994 | Morganstein . |
| 5,311,571 | 5/1994 | Pickert . |
| 5,315,636 | 5/1994 | Patel . |
| 5,325,419 | 6/1994 | Connolly et al. . |
| 5,329,578 | 7/1994 | Brennan et al. ........................ 455/414 |
| 5,353,331 | 10/1994 | Emery et al. . |
| 5,373,548 | 12/1994 | McCarthy ............................... 455/421 |
| 5,463,474 | 10/1995 | Gillig et al. ............................ 455/426 |
| 5,469,496 | 11/1995 | Emery et al. . |
| 5,506,887 | 4/1996 | Emery et al. . |
| 5,526,403 | 6/1996 | Tam ........................................ 455/552 |
| 5,533,027 | 7/1996 | Akerberg et al. ......................... 455/15 |
| 5,548,636 | 8/1996 | Bannister et al. ....................... 455/414 |
| 5,564,072 | 10/1996 | Garcia Aguilera et al. ............ 455/422 |

PERSONAL PHONE NUMBER SYSTEM

This application is a continuation of application Ser. No. 08/321,675 filed Oct. 12, 1994, now U.S. Pat. No. 5,673,308.

TECHNICAL FIELD

The present invention relates to a personal communication service allowing a user to send and receive calls from a single portable handset using a single assigned number, whether at home or roaming. The present invention also relates to providing a seamless method and equipment for interfacing the capabilities of a landline telephone system with a radio link communication system, using a landline. In particular, the present invention is directed to a single number to be used for both cordless and cellular communication without network alterations.

Acronyms

The written description uses a large number of acronyms to refer to various services and system components. Although known, use of several of these acronyms is not strictly standardized in the art. For purposes of this discussion, acronyms therefore will be defined as follows:

Action Control Point (ACP)
Advanced Intelligent Network (AIN)
Advanced Services Platform (ASP)
Authentication Center (AC)
Base Station (BS)
Cellular Subscriber Station (CSS)
Common Channel Inter-office Signalling (CCIS)
Dual Tone Multifrequency (DTMF)
Data and Reporting System (D&RS)
Equipment Identity Register (EIR)
Home Location Register (HLR)
Integrated Service Control Point (ISCP)
Intelligent Peripheral (IP)
Local Access and Transport Area (LATA)
Low-Power Self Contained Cell (LPSC)
Mobile Identification Number (MIN)
Mobility Controller (MC)
Mobile Switching Center (MSC)
Mobile Telephone Switching Office (MTSO)
Overhead Message Train (OMT)
Personal Base Station (PBS)
Personal Communication Service (PCS)
Personal Phone Number (PPN)
Plain Old Telephone Service (POTS)
Private Branch Exchange (PBX)
Private Automatic Branch Exchange (PABX)
Public Switched Telephone Network (PSTN)
Service Control Point (SCP)
Service Management System (SMS)
Service Switching Point (SSP)
Signalling Transfer Point (STP)
Station Message Detail Recording (SMDR)
Service Creation Environment (SCE)
Telephone Company (TELCO)
Temporary Local Directory Number (TLDN)
Transaction Capabilities Applications Protocol (TCAP)
Visitor Location Register (VLR)
Wireless Private Branch Exchange (WPBX)

BACKGROUND ART

Personal Communication Systems (PCS) are designed to allow an individual to communicate with a variety of different systems in a variety of different locations in a seamless fashion using a single Personal Phone Number (PPN). Such systems employ both cordless and cellular telephone systems, as well as traditional landline systems to create the seamless communication for the user. One example of a PCS and the telephone network necessary to accommodate the PCS is found in Ser. No. 07/845,924 allowed on Mar. 8, 1994 and Issue Fee paid on Jun. 8, 1994. This document is incorporated by reference into the present application. It is noted that elaborate accommodations in the landline telephone network are required to accommodated the operation of the PCS. Consequently, elaborate equipment is necessary for the subscribers, and substantive modifications must be made to the landline telephone network and the cellular telephone system. The following are examples of such systems, associated equipment and supporting communications networks.

U.S. Pat. No. 5,311,571 to Pickert discloses a method and apparatus for performing in-bound calling in a wireless communication system having fixed communication units coupled to a telephone system by a telephone line shared in common. Included is a method of handling an incoming call in a wireless communication system having a portable communication unit with an identification code, and a plurality of fixed communication units. Each of the fixed communication units has associated therewith a plurality of radio coverage areas. A plurality of fixed communication units are coupled to a telephone system by a telephone line shared in common by all of them. This telephone line is used for handling calls to and from the portable communication unit. The portable communication unit is associated with the telephone line for receiving the incoming call. The method includes the steps of coupling a plurality of fixed communication units to the telephone line share in common in response to an incoming call, and transmitting signals thereafter from the plurality of fixed communication units in order to establish a wireless communication link with the portable communication unit associated with the telephone line receiving the incoming call. Once the wireless communication link between one of the fixed communication units and the portable communication is established, the signals transmitted from the rest of the fixed communication units are halted.

U.S. Pat. No. 5,210,786 to Itoh discloses a prior art system using a centralized master file which stores location registration data for each subscriber (see FIG. 1). In this system each subscriber has an identification card containing a memory device, and the system terminals include means to read data from the card memories. As a subscriber roams from place to place, at each new location, the subscriber inserts his card into one of the terminals. The terminal reads the subscriber identification data and registers the new location of the subscriber in the master file. Subsequently, if a person calls the subscriber, the master file is accessed and the call routed to the terminal where the subscriber last registered.

The system actually disclosed by Itoh purportedly improves over the above discussed prior art system by distributing the location registration data among different levels of exchanges, instead of using a single master file. The Itoh system provides portable, wireless telephone communication to roaming subscriber's, having a "stratified exchange" network architecture. Each subscriber also has a home base station (FIG. 3A) connected through a telephone line to a local "first class" exchange. The identification of the subscriber's telephone set and home area are registered in the local exchange and in the next highest exchange. As a subscriber roams, the subscriber's terminal will register with different base stations. Each time that a new wireless telephone set registers with a base, the base station executes a registration procedure with the local exchange to indicate the identity of the subscriber and the location at which the subscriber is currently accessible. The network will then route all incoming calls to the base station where the subscriber is currently registered.

If the local exchange normally services that subscriber as the subscriber's home exchange, no further registration procedures are needed. However, as the subscriber roams outside of the home exchange area, the local exchange receiving a registration request from a subscriber must exchange registration and validation type information with the subscriber's home exchange and at least one higher level exchange serving the subscriber. For large areas of coverage, Itoh proposes as many as five levels of exchanges, and the further afield the subscriber roams, the higher up the registration procedure must go until it reaches an exchange which services the particular subscriber. If the first level exchange does not serve the subscriber, it accesses the second level exchange, if the second level exchange does not serve the subscriber it in turn accesses the third level exchange, and so forth.

U.S. Pat. No. 5,210,785 to Sato et al. discloses a mobile telephone terminal for communicating via either a link to a cordless telephone type base station or to a portable radiophone network (apparently the same as or similar to a cellular telephone network or the like). The portable terminal shown in FIG. 1 includes two wireless transceiver units 2 and 3. The wireless transceiver 2 performs cordless telephone type communication, and the wireless transceiver 3 performs radio telephone or cellular type communication. As described, cordless telephone type communication involves low power and is effective at short ranges, e.g. close to the subscriber's home base station. The portable radiophone communication utilizes more power and operates at greater ranges.

Each of the wireless transceiver units 2 and 3 detects whether or not the terminal is within range of a corresponding base or cell cite and provides a range-indicating signal 4 or 5. The terminal control unit 8 (FIG. 2) determines which wireless transceiver to use based on the range-indicating signals 4 and 5. If within range of the cordless telephone base station, the control 8 selects the cordless telephone transceiver 2. If the terminal is out of range of the cordless telephone base station but is at a point accessible to the portable radiophone network, the control 8 selects the portable radiophone transceiver 3.

U.S. Pat. No. 5,197,092 to Bamburak discloses a peripheral device for use with a personal communicator, such as a cellular telephone or similar device. The peripheral device, referred to as a "receiving station", is capable of two-way communication with a personal communicator placed therein. The combination of the receiving station apparatus and the personal communicator provides information to a central exchange in the personal communications network regarding the current location of the personal communicator.

As shown in FIG. 1, the receiving station, 10 is configured to receive the personal communicator 12, which otherwise can be carried on or about the person of the user. Typically, upon arrival at the location of a receiving station, the user will simply place the personal communicator 12 on or in the station 10. Each receiving station 10 includes a receiving switch (not shown) which is actuated when the personal communicator 12 is placed therein. The actuation of the switch initiates the operation of the receiving station to begin the location updating or registration process within the overall communications system of which the personal communicator 12 is a part. Each receiving station 10 also has a memory which includes a call forwarding number identified specifically with that receiving station.

FIG. 3 shows the detailed flow of communication between the receiving station 10, the personal communicator 12 and the central exchange in the personal communications network. When the personal communicator 12 is placed in the receiving station, there is first a verification, shown as block 20, that the receiving switch at the receiving station has been closed. In the next step in the process, block 22, a verification is made by the receiving station that the personal communicator has in fact been turned on. If not, the receiving station 10 turns on the personal communicator 12, as shown at block 24. Once the personal communicator is on, the receiving station obtains the particular telephone number at the personal communications network's central exchange which has been assigned for receiving updated location information and the system identification (SID) number, which are both stored in memory in the personal communicator (block 26)

With this information, the receiving station determines the proper dialing sequence to contact the central exchange (block 27) and then dials the update number via the conventional landline system (block 28). If the central exchange in the personal communications network ("home system" in block 29) does not answer, the number is dialed again (up to a total of three times, as shown in block 30). When a connection is made with the central exchange, the receiving station provides the central exchange with the call forwarding number of the receiving station for the personal communicator (block 35).

The call forwarding number, indicating a precise location or registration point, for the personal communicator is now in the central exchange of the home system personal communications network, and the home network will direct any call subsequently made to the subscriber to the call forwarding number. In the system of FIG. 2, that call will be placed through the conventional landline system to the receiving station.

U.S. Pat. No. 5,157,710 to Itoh discloses a cordless handset telephone 2 for connection via a base unit 1 to a telephone line 3. The key features of the disclosed cordless telephone system relate to identification of the cordless handset telephone 2 as matching the base unit 1, while still allowing modifications of identification codes to allow a different cordless handset telephone to operate with the base unit. Either the base unit or the handset unit has a non-volatile read only memory (ROM) storing the identification code. The identification code from the ROM is transferred to a writable memory in the other unit to establish the necessary matching relationship between the handset and base. For example, in the first embodiment (FIG. 1), the ID ROM 28 in the base unit permanently stores the identification code. When the handset is placed on the base station to charge the battery, the base station transfers the code from ID ROM 28 to ID RAM 60 in the cordless handset.

One embodiment of the Itoh Patent, described in lines 30–38 of column 8, includes a security procedure to prevent an unauthorized person from arbitrarily or accidentally triggering the rewriting of the identification code. In this embodiment (FIG. 6), RAM 67 in the base unit 1' stores an authorization code, referred to as a "secret" number. The system rewrites the identification code from one radio unit to the other only when a person inputs a code on keypad 69 which matches the stored "secret" number.

U.S. Pat. No. 5,142,654 to Sonberg et al. discloses a roaming cellular subscriber to specify which of several available options, such as transparent call forwarding and caller notification, should be applied to process incoming calls directed to the subscriber. As shown in FIG. 1, each mobile telephone switching office (MTSO) has a voice response system (VRS) 12 and an interface that connects to a central host computer 14.

The VRS 12 connects to the MTSO switch 16 via a digital telephone interface 18. The home MTSO switch 16 is programmed to route all calls for a roamer that has selected a call routing option. In the disclosed embodiment, a roamer selects a call routing option by entering specific codes in his handset, either in his home service area or a foreign service area.

The flow chart in FIG. 2 depicts the activating of transparent call forwarding. When a roamer dials *31, the foreign MTSO switch 16 sends the mobile identification number (MIN) and the code for the selected call routing option to the VRS 12. The VRS 12 accepts the information and communicates it to the central host computer 14 via a data communications link 17.

After receiving the mobile identification number and selection code for the call routing option, the central host computer validates the subscriber. The appropriate commands are then sent by the central host computer 14 to the home MTSO to set up the call routing option that has been specified by the roamer. If the call routing option that was selected by the roamer is transparent call forwarding, the central host computer 14 obtains a temporary telephone number from the roam MTSO that the MTSO has associated with the mobile identification number of the roamer. This temporary telephone number must be assessable via the PSTN because it is the phone number to which the caller will be transferred. After the temporary telephone number is obtained from the roam MTSO, the central host computer 14 signals the home MTSO to complete the activation. The central host computer 14 first determines that the roamer is currently call forwarded or no-answer transferred to other numbers, and if so, these numbers are saved and the existing feature is deactivated so that calls will no longer be directed to the number where they were previously directed.

Referring now to FIG. 3, when the central host computer 14 determines that it is time to deactivate a call routing of a roamer, it sends commands simultaneously to a home MTSO and the roam MTSO. At the home MTSO the roamer is restored to his original call routing status with the former call forwarding and no-answer transfer numbers restored. At the roam MTSO, the temporary phone number that has been obtained is freed so that is can be used for other roamers. Deactivation is initiated by either the roamer selecting a deactivation of the call forwarding from the mobile telephone by dialing *310, or automatically after x number of hours (where x can be set dynamically by the carrier).

U.S. Pat. Nos. 4,980,230 and 5,127,042 to Gillig et al. disclose a system which allows a single handset (10) to operate as a cordless handset through its home base unit (180) and as a cellular telephone through the pubic cellular system. In one embodiment (FIG. 2 of each Patent), a wireless telephone (100) includes a cellular transceiver (120), an antenna (128), a keyboard (140), a display (180), a handset (160), and a microcomputer (130) together with a cordless transceiver (110) and an antenna (118), all in a single housing. Whenever the wireless telephone (10) is within range of its cordless base station (180), telephone calls may be sent or received via the cordless radio channel or transferred from the cellular radio channels to the cordless radio channel. If the telephone (10) thereafter moves out of range of the cordless base station (180), telephone calls may be sent or received over the cellular radio channels or transferred from the cordless radio channel to one of the cellular telephone channels.

Although the wireless handset can alternately receive calls through the home telephone line via the cordless base station and through the cellular system, there is no disclosure of how the network might selectively route such incoming calls to the cordless base or to the cellular system to reach the user at the user's current location.

U.S. Pat. No. 4,980,907 to Raith et al. discloses a system wherein a wireless handset can operate via a home base station or via a public radio transceiver station similar to that serving a cell of the cellular telephone network. FIG. 1 shows a public switched telecommunication network (PSTN) including local network exchanges LNX1 to LNX8 to which subscriber equipment connects, network transit exchanges TNX1 and TNX2 for switching calls, and network trunks NT for interconnecting the local and transit exchanges. The network may include at least one network subscriber store (NSS) for recording information about subscribers to the network. For example, each local exchange may comprise a network subscriber store NSS for information on subscribers having subscriber equipment connected to that local exchange. Exchanges of the network also comprise network information stores NIS for storing information regarding trunks to other exchanges, numbering, routing. etc., which enables exchange processors to set up calls to and from subscribers and disconnect calls.

As illustrated, eleven pieces of residential subscriber equipment RSQ1 to RSQ11 connect to the local exchanges LNX1 to LNX5 and LNX8 of the network. Five private automatic branch exchanges PABX1 to PABX5 connect to the local exchanges LNX2 and LNX5 to LNX8; and five telepoint radio stations TSN1 to TSN5 connect to the local exchanges LNX4 and LNX5 and LNX7. Three telepoint transceiver controllers TTC1 to TTC3 are connected to the local exchanges LNX3 and LNX6 and LNX8. Each portable radio terminal (PTR) can operate at a subscriber's residence as part of residential equipment, or in a commercial subscriber's business area as an extension to a PABX. When away from such subscriber locations, however, each portable radio terminal (PTR) can operate through one of the telepoint radio transceivers.

Each residential radio transceiver, each exchange radio transceiver and each telepoint radio transceiver frequently scans and transmits radio signals on at least one of a predetermined group of radio channels. The radio signals from such a transceiver include information regarding transmitter identity, and in appropriate cases, PABX identity or TST identity or TTC identity. An exchange radio transceiver or a telepoint radio transceiver also may page a portable radio terminal by transmitting radio signals including data identifying the paged terminal on at least one of the radio channels.

A portable radio terminal frequently scans one or more or all of the radio channels of the predetermined group for receiving radio signals from the nearest residential, exchange or telepoint radio transceivers. When receiving appropriate radio signals, the portable radio terminal determines from the received signals the identity of the transmitting radio transceiver and may determine other information, such which channels are available, etc. The information is stored in the portable terminal memory, and is updated with more recent corresponding information obtained in subsequent scans. Based on the strength and/or quality of radio signals received and/or other information as to detected active transceivers stored in the portable terminal memory (and possibly predetermined preference rules), the portable terminal computer chooses one of the fixed point transceivers as its current serving transceiver. When a portable radio terminal chooses a transceiver of a telepoint radio station or a transmitter connected to a telepoint transceiver controller as its current serving transceiver, the portable radio terminal tries to inform its subscriber location store of the identify of the chosen transceiver.

If the radio terminal is normally part of a subscriber residential equipment, the portable radio terminal tries to set up a call to the corresponding residential base radio station. The call is set up using the telepoint radio station or transceiver controller of the serving radio transceiver and the PSTN. When the residential base radio station answers the call the portable radio terminal initiates transmission of a coded message comprising information on the identity of the calling portable radio terminal, the network subscriber number of telepoint station or controller chosen to serve as the radio transceiver, and possibly the identify of the serving radio transceiver. The residential base radio station stores the received information. Subsequently, when a call for the portable radio terminal comes in, the residential base radio station forwards the call through the network as a call for the telepoint radio station or the telepoint transceiver controller identified as the serving radio transceiver, in accordance with the stored information.

If the portable radio terminal is normally an extension of a PABX, the terminal tries to call the PABX after it chooses a serving radio transceiver which is not one of the radio transceivers of the PABX. The call is set up using the PSTN and serving transceiver and associated radio station or controller. When the called PABX answers the call, the portable radio terminal initiates transmission of a coded message comprising at least information on the identity of the calling portable radio terminal and the network telephone number of the residential or telepoint station or controller chosen as the current serving radio transceiver. This coded message may also identify the serving radio transceiver. The PABX stores the received information. Subsequently, when the PABX receives a call for the portable radio terminal, the PABX forwards the call to the network as a call for the telepoint radio station or the telepoint transceiver controller or the residential base radio station currently serving the particular terminal, in accordance with the stored information.

A call for a portable radio terminal forwarded by a residential base station or a PABX to the network as a call for a telepoint radio station or telepoint transceiver controller is answered by the telepoint station or transceiver controller. When the telepoint radio station or transceiver controller answers the call, the residential base station or PABX which forwarded the call sends information as to the identify of the called portable radio terminal. This information may be the network subscriber number or the branch extension number of the portable radio terminal. The transceiver controller then initiates broadcast paging of the portable terminal from all radio transceivers connected to the particular transceiver controller.

The portable radio terminal receiving the paging signals sends a response to its chosen serving radio transceiver. The response is forwarded by the radio transceiver to the transceiver controller. The transceiver controller then forwards the call to the serving radio transceiver for radio communication with the portable radio terminal, and the call is established all the way through the network to the intended portable radio terminal.

U.S. Pat. No. 4,852,156 to Shigenaga discloses a system for routing telephone calls for a subscriber to a telephone set at which the subscriber is currently registered. In the disclosed system, each subscriber has an integrated circuit (IC) card which stores the subscriber's personal identification number. In a registration mode at a new location, the subscriber inserts the card into a telephone having an appropriate card reader. The subscriber's personal identification number is read from the card and transmitted to an exchange. The exchange stores the telephone number of the telephone through which the subscriber registered in association with the station subscriber's personal identification number. Subsequently, when a call comes in to the exchange for the particular subscriber, the exchange accesses the stored data and retrieves the telephone number for the telephone station through which the called subscriber last registered. Using that telephone number, the exchange routes the incoming call to the telephone at the subscriber's current location.

U.S. Pat. No. 4,748,655 to Thrower et al. discloses a system for providing a subscriber with mobile telephone services through a portable low power wireless handset. The portable telephone 11 allows the user to access the PSTN 3 and/or the cellular radio telephone network via a number of different gateways, including the user's home telephone 13, a PABX 14, a communal multi-channel unit 15 or the user's cellular mobile telephone set 9. The portable telephone 11 automatically transmits its identification code to one of the gateways when it enters the gateway's service area, enabling routing of incoming calls through the appropriate gateway to the subscriber's portable telephone.

The "gateway" is essentially similar to a base station in a cordless telephone system. When the gateway 13 is in the subscriber's home, the gateway connects to a telephone line of the PSTN 3, in the normal manner. In some case, however, the telephone line to the network has been replaced with a second RF link, specifically a cellular link. For example, the multi-channel unit 15 provides cordless communications with handsets 11, and relays signals for those handsets to and from a cellular base station 7.

In one example of the cellular gateway feature, the subscriber's cellular mobile telephone 9 would be equipped with a transceiver for wireless communication with the portable handset 11. Assuming the mobile telephone is in a car, the user could leave the car and take the handset with him. The subscriber could communicate with the mobile telephone from the handset, and the mobile telephone in turn would extend the communication through the cellular network as if the user were operating from the handset of the cellular telephone itself.

U.S. Pat. No. 5,315,636 to Patel describes a location-independent personal communication system which enables a subscriber to have a single personal telephone directory number. When that personal telephone number is dialed, the system uses the existing public and cellular communication systems and a service node, all of which comprise parts of the personal communication system, to route the call to a present or last known location of the subscriber. The location of the subscriber is determined by the personal telecommunications system through a radio tracking system having a number of radio base stations that monitor the subscriber's location by communicating with a personal communicator carried by the subscriber. The subscriber location information is transmitted from the base stations to the service node for storage and subsequent access when a call is placed to the subscriber's personal telephone number. The service node will then transfer the call to the proper telephone number at the location where the subscriber is currently, or last known to be located. If this is not a fixed location with a known phone number, the system will notify the subscriber through the base stations and the personal communicator of an incoming call.

U.S. Pat. No. 4,878,238 to Rash et al. discloses a cordless telephone network having a base unit that is interconnected into a normal telephone network. The network also includes a plurality of hand-held cordless telephones. Each of the hand-held cordless telephones has a distinctive identification code. The base unit temporarily stores the identification code of the hand-held unit with which it is communicating during a call. Thus, the base unit will not communicate with other hand-held units having different identification codes during that call. Each of the hand-held units has the ability to scan a plurality of cordless telephone channels for either receiving a call on a channel on which its identification code is transmitted, or placing a call on a channel on which a base unit transmits a "free channel" signal. The hand-held units each have a voice activation/deactivation circuit which allows the hand-held unit to send and receive audio signals only when it has been given permission to do so by a base unit. Also, each of the hand-held units has the capability of scanning a plurality of cordless telephone channels when it is in a mode capable of both receiving and placing calls. In order to receive its identification code on one of these channels, when it is receiving calls, and in order to receive a "channel free" transmission from a nearby base unit when it is placing a call, the hand-held unit must be in a designated mode.

U.S. Pat. No. 5,309,502 to Hirai discloses a radio telephone having a cordless or cellular only mode and a cordless/cellular mode. The subject radio telephone includes a cordless telephone fixed set and a mobile set. The cordless telephone fixed set is connected to a telephone line. The mobile set includes a transmitter and a first receiver for radio communication with the cordless telephone fixed set. In addition, the mobile set includes a second transmitter and a second receiver for radio communication with an external base station. The mobile set includes a device for instructing a communication start, as well as a device for detecting an answer signal outputted from the cordless telephone fixed set. The mobile unit also includes a device for enabling the first transmitter to transmit a talking start signal wherein the instructing device instructs the communication start. The mobile set further includes a device for enabling a second transmitter to transmit a talking start signal when the first transmitter has already transmitted a talking start signal but the detecting device fails to detect an answer signal in response. As a result, when the detecting means detects that the cordless telephone unit has failed to communicate with the cordless telephone fixed set, the mobile set operates to automatically enable communication with the base station (cellular) to compensate for the failure in the first communication between the cordless telephone unit and the cordless telephone fixed set.

U.S. Pat. No. 5,325,419 to Connolly et al. is directed to a wireless digital personal communication system having voice/data/image two-way calling, and intercell hand-off. The system includes a plurality of intelligent base stations and portable hand-set terminals, each having a predetermined radio cell coverage area. The radio cell, and radiotelephone PCS has a full Integrated System Digital Network (ISDN) interface. The PCS facilitates direct interconnection of switching of PCS call traffic through the ISDN interface and the Public Switched Telephone Network (PSTN), or any switch network. The PCS has voice/data/image (or any combination thereof), and incoming and outgoing calling capability. The PCS is fully operational and compatible with any modulation approach selected. The intercell protocol hand-off is provided through distributed logic which is implemented in software that is resident in the intelligent portable hand-set terminals and in the intelligent base stations. Further, such software can also be resident in the PSTN, or any switched network. The PCS also can accommodate a wireless digital personal communication system having authentication means for authenticating a remote device, and security means for securing signal and message content between an intelligent base station and a remote device. The security means includes a predetermined encryption and decryption technique. The PCS can also have dynamic zone grouping of portable hand-set terminals, as well as call forwarding for unanswered calls.

U.S. Pat. No. 5,260,988 to Schellinger et al. is directed to an apparatus and method for alternative radio telephone system selection. The system uses a dual mode cellular cordless portable radio telephone, preferentially operating to select the cordless base station over the cellular system when in range of the cordless base station. When the cordless cellular portable is operating in the cellular mode, the radio channel associated with the cordless base station is sampled for a predetermined time. When a signal on the sampled cordless base station channel is detected, the cordless portable moves into the cordless mode and remains in the cordless mode for as long as the signal quality of the cordless signal channel exceeds a predetermined value. The system can be operated so that a second radio telephone system having a wide radio coverage area is selected when a first radio telephone system is unable to complete communication.

U.S. Pat. No. 5,309,504 to Morganstein is directed to an automated identification system used to identify attendant positions in a telecommunication system. This identification system is used in a communication complex having attendant positions and data terminals. This system includes an interactive call processor which receives incoming calls and directs the same to a switching system. The call processor also communicates with a data base host computer adaptor for communicating with a plurality of data terminals. The incoming telephone calls are received by the call processor and voice prompts are returned so that the calling party can enter his or her identification information. When received by the call processor, such information is temporarily stored for later transferral to the data based computer. The call processor then requests service of the switching system which selects an idle attendant position. The call processor transmits to the attendant a voice prompt to input attendant position identification information. This information is also received and stored by the call processor. The call processor consults a look-up table which correlates the various attendant positions with the data terminals. The calling party identification information and the correlated data terminal identity is transmitted to the host computer so that the appropriate data can be displayed on the terminal associated with the selected attendant position. The calling party is then put through by the call processor through the switched connection of the switching system to audio equipment associated with the selected attendant position. The attendant can then communicate with the calling party using the displayed data.

U.S. Pat. No. 5,303,287 to Laborde is directed to an integrated personal/cellular communication system architecture. This architecture includes a switching center, coupled to a PSTN, which selectively transfers signals between the PSTN and a Digital Cellular Network (DCN), or a Personal Communications Network (PCN). The PCN has allocated to it a portion of the cellular communications band according to the discretion of a local cellular operator. Each PCN sub-network includes several microcells arranged in a multi-dimensional grid. The allocated cellular channels are divided into sets assigned to columns of the grid. The allocated portion of the cellular spectrum is re-used within each PCN sub-network by assigning the same set of frequencies to more than one of the columns so that different communications signals can be transferred over the same cellular channels.

U.S. Pat. No. 5,157,660 to Kuwahara et al. is directed to a communication system having both portable terminals and fixed terminals. Each of the portable terminals is capable of calling a partner terminal via a radio channel. A plurality of fixed terminals are connected via an ISDN interface to a time-division switch. The fixed terminals are also connectable to portable terminals. When two portable terminals have established a cell and are respectively attached to two fixed terminals, a call is automatically transferred to the two fixed terminals so that speech can be achieved between the fixed terminals without conducting additional call-establishing procedures.

U.S. Pat. No. 5,212,684 to MacNamee et al. is directed to the protocol and transceiver for a cordless/cellular telephone service. This system accommodates operation in the cellular mode. The typical cell size is between 500 meters and three kilometers in radius. Each cell has at least one base station connected to the PSTN and one or more portable stations which are capable of roaming within the cell. Radio communications can be initiated by either the portable stations or the base stations. Each of the portable stations and base stations has a radio transceiver arranged for time division duplex communication, a codec operating at 32 kilobytes per second or 11.4 kilobytes per second. Each of the stations also has means for transmitting digitized speech in accordance with a framed structure comprising three full rate or six half-rate channels per carrier. These carriers are modulated at a carrier bit rate of substantially 270.8333 kilobytes per second. The system can accommodate both internal and external hand-off, if required.

U.S. Pat. No. 4,745,632 to Duffy is directed to a wireless mobile telephone communication system. This system is designed to integrate a conventional wireless telephone unit with a conventional mobile telephone unit to provide remote capabilities. Integration is achieved by an interface which is adapted to acoustically or otherwise couple a wired hand-set of the mobile telephone unit (within a car) to a remote wireless hand-set through a wireless transceiver/control unit. This system allows the driver of a mobile telephone-equipped vehicle to use a low-cost wireless telephone unit to receive calls while away from the vehicle.

U.S. Pat. No. 5,260,987 to Mauger pertains to a cellular system that is associated with a local network. The system is such that local calls between mobile subscribers and the local network can be made without involving remote mobile-services switching centers, thereby permitting an inexpensive local call tariff to be employed. The base station controller (BSC) is an intelligent system.

FIG. 2b illustrates the system wherein the intelligent base station controller is shown as 2 and the local network is shown as 1. The local network 1 is connected to a port of the intelligent BSC and then to the local MSC (Mobile Switching Center) 4 via link 5. The device operates on the premise that the intelligent BSC has all the signals passing through it and monitors those messages. The intelligent BSC is able to slave its location register off the main network location register without the latter being aware that is occurring. It is able to identify calls from the MS that are local and terminate them to the local network 1. Thus, local calls can be charged at a local rate.

FIG. 3 is diagram showing a successful non-local call made between a MS subscriber and a PSTN network 1. FIG. 4 is a diagram that shows the completion of a local call. FIGS. 5–8 illustrate further messages forwarded by using the intelligent BSC.

U.S. Pat. No. 5,251,248 to Tokunaga et al. discloses a personal communication system for routing a traveling subscriber's incoming calls to a different location identified by registration data stored in a central memory (M).

In the disclosed system, when a user expects to operate his or her radiotelephone in an area serviced by a remote base station or through a remote local telephone loop, she initiates a call to a special number allocated to registration procedures, through the base station or local loop the subscriber expects to operate through. The subscriber's personal number is read from her portable station, or the subscriber inputs the personal number manually using a standard telephone. The personal number and line identification for the line to the base station or the local loop from which the call originates are then forwarded to a registration means (RW) associated with the memory (M), via a central signaling network (CSN). If the received information passes an appropriate security check, the registration means (RW) writes the line identification into the file corresponding to the subscriber's personal number.

When a person wishes to call the subscriber from an ordinary telephone TE, that person simply dials the subscriber's personal telephone number. With reference to FIG. 6, the subscriber switch ($LS_2$) detecting the off-hook and dialing, recognizes the first three digits of the subscriber's personal number and routes the call to a toll switch ($TS_2$). In response to the call, the toll switch ($TS_2$) accesses the memory (M) via the central signaling network (CSN). The memory (M) retrieves the current registration data corresponding to the called personal number from its reference table and returns the address for the subscriber's last registration to the toll switch ($TS_2$). Using this address, the system routes the call to the line to subscriber's current location, e.g. through the toll switch ($TS_1$) and the local subscriber switch ($LS_1$). The local subscriber switch $LS_1$ applies a signal to that line to ring the subscriber's personal telephone.

U.S. Pat. No. 5,090,051 to Muppidi et al. describes a CT-2 (second generation cordless telephone) system and problems relating to directing incoming calls to a CT-2 telephone set not within range of its home base station. As described therein, each CT-2 cordless handset can initiate or receive calls when within range of the associated home base station. When away from home base, a handset can initiate a telephone call if it is within range of any other one of the CT-2 base stations, but it cannot receive an incoming call. As part of the background discussion of Muppidi et al., it is noted that prior proposals have been made to include a wide area paging receiver in the CT-2 handsets, but the discussion thereof takes the position that the addition of some means to receive the paging signals to the CT-2 handset complicates the cordless telephone design. The Background also indicates that prior art systems, such as cellular telephone systems, locate roaming radio telephone using one or more control channels. Muppidi et al. conclude, however, that a simpler system is more desirable for the CT-2 network. Muppidi et al. therefore intend to develop a system to direct incoming calls to a CT-2 telephone when away from its home base station, without using a control channel and without incorporating a paging receiver into the CT-2 telephone.

As disclosed, the Muppidi et al. system includes a central switch, such as a wireless PABX 14, a network controller 16, a paging transmitter 20 and a plurality of CT-2 base stations 12 connected to the PABX 14. Rather than include a paging receiver in the CT-2 telephones, Muppidi et al. provide means in each of the base stations for receiving paging signals. When a subscriber using a CT-2 telephone is away from the home base station, a caller wishing to reach that subscriber dials a remote ID telephone number for that subscriber; and the call is routed to the PABX. The wireless PABX 14 initiates a paging message through the transmitter 20. The paging message includes the ID of the destination CT-2 handset and connection information for connecting the CT-2 telephone to the particular incoming call.

Each base station receives the broadcast paging message and determines if a radio transceiver and associated telephone line are currently available. If so, the base station transmits the CT-2 handset's ID over an available one of the radio channels used for voice communication. Each CT-2 telephone scans the radio channels. If a CT-2 telephone detects its own ID on one of the channels, that telephone transmits a response message to the base station on the channel over which it detected its ID code. The base station receiving such a response then dials in to the PABX utilizing a telephone number from the connection information included in the original paging signal. The PABX connects the line from the base station to the line on which the caller originally called in, and the base station sends an alert signal to the CT-2 telephone to produce a ringing sound to alert the called party. When the called party answers, using the CT-2 telephone, a voice connection is completed between the caller and the called party.

U.S. Pat. No. 5,259,017 to Langmantel discloses a cordless telephone system used with a private automatic branch exchange. As shown in FIG. 1, cordless phones MT are arranged in groups FB1, FB2, FB3 that communicate through base stations FS1, FS2, FS3 and lines TL with the PABX. There are fewer base stations FSn than mobile sets MT. From each base station FSn a connection can be set up to any mobile set MT. The movement of a mobile set into the radio cell of another base station is updated via the call-forwarding and follow me facilities of the PABX. This administration of the PABX allows the individual identifications of the mobile sets MT to be exchanged with the respective base stations FSn even if no calls are being made. As a result, a cordless subscriber can be reached even if he is moving out of the radio cell of one base station.

U.S. Pat. No. 5,243,645 to Bissell discloses an intelligent network system for forwarding a traveling subscriber's incoming calls to a different location identified by an automatic registration performed when the subscriber engages in a business transaction or activity that indicates his or her location.

The disclosed system is intended as an improvement over systems requiring manual registration of location by the subscriber. The Background of the Bissell et al. Patent indicates that automatic registration of roaming cellular subscribers is prior art over which Bissell et al. intend to distinguish. In this regard, Bissell et al. specifically refer to a cellular system disclosed in U.S. Pat. No. 4,901,340 to Parker et al. Parker et al. add an FMR (follow-me-roaming) processor to the switch in a foreign or roaming mobile telephone switching office (MTSO) of a cellular system. When a subscriber roams into the area serviced by the MTSO and wishes to receive calls through that MTSO, the subscriber must place a request with that MTSO. The foreign MTSO assigns a temporary directory number to the subscriber and transmits that number to the subscriber's home MTSO as part of an instruction to the home MTSO to forward all future calls for the subscriber to the foreign MTSO. The Bissell et al. system requires no extra effort on the part of the subscriber to keep his/her present location current in the data base because an update is activated by a transaction that would occur normally. It is not necessary for the subscriber to remember specifically to update his or her data base record, as in the conventional systems.

In the Bissell et al. system, the transaction/activity can be any action that initiates updating of the electronic data base with information that directly or indirectly indicates the subscriber's identity and whereabouts. Examples include the use of a credit card at a location such as a hotel or airport, the making of a long distance telephone call with a credit card that identifies the subscriber or the use of an Automated Teller Machine (ATM).

When a transaction occurs, information describing both the subscriber and his or her location is forwarded to a centralized data base in order to update a subscriber record that indicates the status of the subscriber's availability and if or where the subscriber may be reached. In the example disclosed in detail, the transaction involves a credit card purchase. As part of such a transaction, a credit card terminal is used to scan a subscriber's credit card. The credit card terminal then initiates a call which results in a data communication with a bank's host computer 140 and/or a computer 148 operated by the card issuer. When either of these computers 140, 148 receives a credit card call, the computer provides appropriate update information to the subscriber location data base 150 (see e.g. column 4, lines 27–33).

During processing of calls to the subscriber, a telephone switching office will obtain information from the location data base 150 to control call processing at least in part as a function of the subscriber's last known location indicated in data base 150. For example, the telephone system may use the location information to reroute subsequent calls to the subscriber's number to a number associated with the subscriber's registered location indicated in the data base (see paragraph bridging columns 4 and 5 of the Bissell et al. Patent). Alternatively, the data base information may be accessed if a call placed to the subscriber's ordinary home or office number (or wireless personal phone) is not answered, such that the call is then forwarded to the reach number determined by the current registration information in the data base. Other options include use of the data base to provide an announcement to a caller that the subscriber can be reached via a different number, either using a cellular telephone call, paging or other over-the-air communication directed to a particular area in which the subscriber is located.

If the subscriber has a cellular telephone or a pager, a normal call to the subscriber's cellular telephone or pager from telephone 160 might proceed via local office 174, traffic service position system (TSPS) 164, toll switches 163, 162, and 168, and local office 172 to a wireless service provider system 194 (FIG. 2). The wireless service provider system 194 transmits an over-the-air signal in an effort to complete the call to the subscriber within its geographic territory, in a normal manner. If no response is received, however, the TSPS 164 may query data base 150 to determine that the subscriber is now registered in a different area. Using the information from the location data base 150, the call is rerouted, for example via toll switches 163 and 162 to local office 173, and thence to a second wireless service provider 196, that serves the area where the subscriber last registered. Alternatively, data base 150 may return a message to the caller indicating the area code or other geographic indicator needed to page the subscriber in the vicinity of hotel 192. In other circumstances, data base 150 may be arranged to forward an unanswered call made to a wireless service provider (e.g. provider 194) to a terrestrial based telephone (e.g. telephone 190).

The aforementioned conventional art constitutes the background of the present invention and is incorporated herein by reference. It is noted that this background fails to provide techniques by which seamless personal communication can be carried out without substantial modification to either the landline telephone system or the cellular telephone system. The necessity of such modifications limits the flexibility of personal communications systems known in the conventional art, since each modification of a personal communication system requires corresponding modifications in either the landline telephone system, the cellular telephone system or both.

DISCLOSURE OF THE INVENTION

The primary object of the present invention is to overcome the aforementioned disadvantage with respect to system modification necessary to affect seamless personal communications. Additional objects, advantages and novel features of the present invention are set forth in part below, and in part will become apparent to those skilled in this art upon examination of the following disclosure of the invention.

Another object of the present invention is the provision of seamless personal communication service without the addition of a new licensed frequency spectrum. Yet another advantage of the object of the present invention is the provision of personal communication service without the use of licensed spectrum within the home zone of a subscriber, as defined by the range of a cordless telephone base station.

Still another object of the present invention is the provision of personal communication service without the necessity of providing additional compensation to the cellular telephone service when a subscriber is within his home zone, as defined by the range of the cordless telephone base station.

An additional object of the present invention is the provision of personal communication service without modifications to existing cellular or landline telephone systems.

Still a further object of the present invention is the protection of a landline telephone system used in the provision of personal communication services against the undesired provision of wireless bypass by competing service providers.

Yet an additional object of the present invention is the provision of a back-up communication mode for a subscriber to a personal communication service.

Still an additional object of the present invention is the avoidance of roaming charges while maintaining communication to a personal communication service subscriber outside of his "home" cellular system.

These objects and advantages may be realized and obtained by means of the instrumentalities and combinations particularly pointed out in the appended claims as summarized below.

The present invention is used within the context of a Personal Communication System (PCS), and requires the use of cellular call forwarding capability in the associated cellular telephone system supporting the PCS. The system also requires means for recognizing a personal phone number assigned to a subscriber and user of a portable station or hand-set. The system further requires means for determining the location of that subscriber when using an associated portable station. Also required are means for storing the location of the subscriber within the system. The system depends upon the provision of properly programmed Customer Premises Equipment (CPE) including at least one cordless base station operating at cordless telephone frequencies and connected to a landline telephone system. The cordless base station includes means for indicating the location of at least one selected portable station associated therewith. At least one portable station is associated with each of the cordless telephone base stations. Each portable station has a PPN, and is detectable by the corresponding cordless telephone base station.

A key feature of the present invention is the arrangement of the cordless telephone base station to control the generation of a signal requesting cellular call forwarding for a PPN of a portable station in communication with the cordless telephone base station. Once cellular call forwarding is requested, the portable station in communication with the subject cordless telephone base station is controlled so that the cellular functioning of that portable station ceases.

The portable hand-set is arranged so that it contains both a cordless telephone transceiver and a cellular telephone transceiver. The portable station also has the capability of detecting when it is outside the range of an associated cordless telephone base station. When such detection is made, the portable station reactivates its cellular functioning and sends a signal to the cellular telephone system cancelling the cellular call forwarding operation.

BEST MODE FOR CARRYING OUT THE INVENTION

The home base station, that is, the cordless telephone base station to which a particular subscriber portable station or hand-set is associated, is structurally similar to conventional art cordless telephone base stations. However, a key difference is that the home base station or cordless telephone base station contains transceivers for both cordless telephone frequencies and cellular telephone frequencies. The cellular signaling protocols can be similar to those of the cellular network as described in U.S. patent application Ser. No. 07/845,924 (filed Mar. 5, 1992) when the cordless telephone base station communicates with the cellular system over cellular frequencies.

Figure 1:
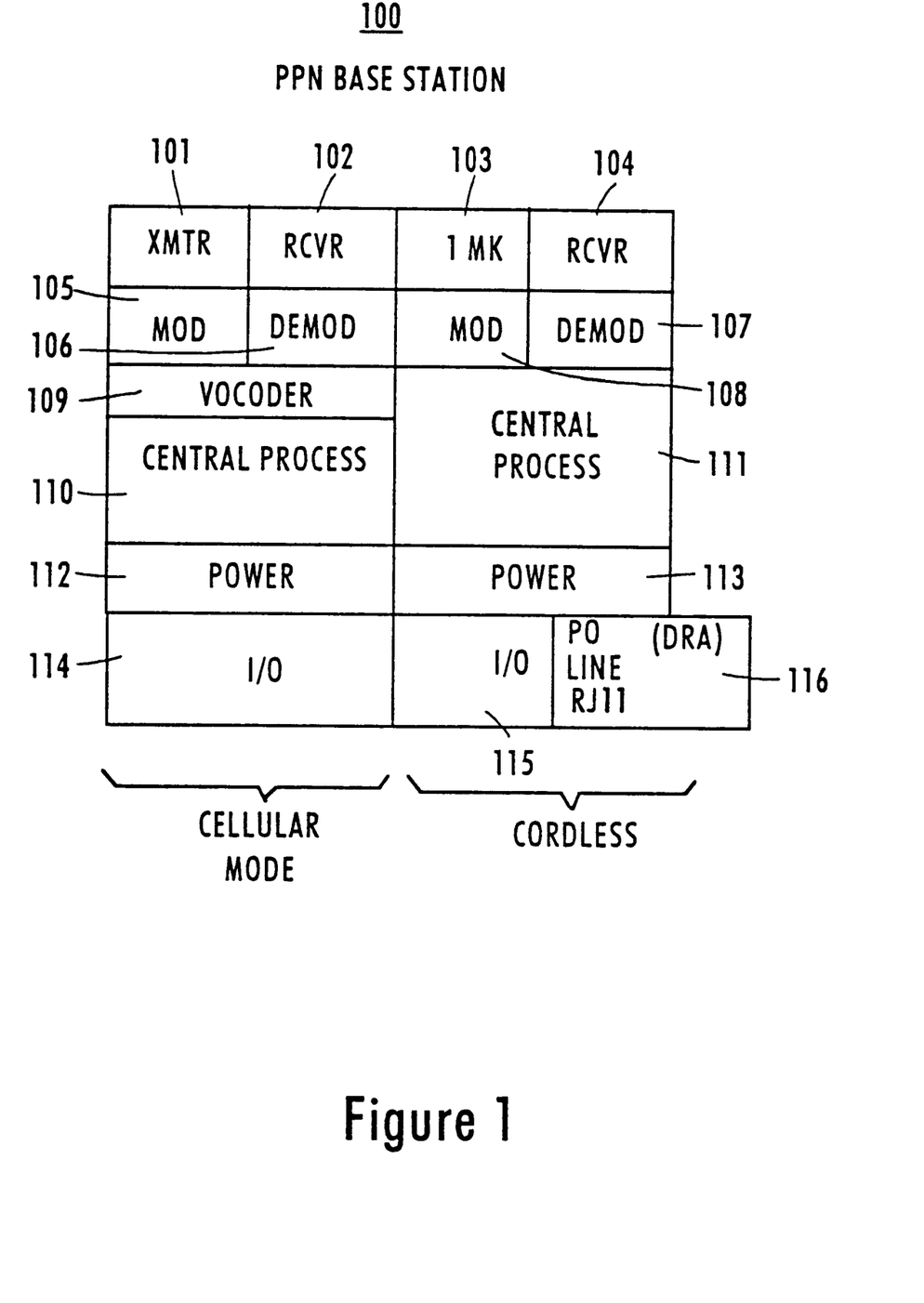
FIG. 1 is a block diagram representation of the base station used to carry out the personal communication service of the present invention.

A block diagram of a typical home base station/cordless telephone base station is depicted in FIG. 1. The cordless base station includes an interface 116 with a landline telephone network, as is well known in the conventional art. The I/O interface 115 is used to program the central processor 111 to provide recognition of appropriate subscriber handsets or portable stations. The central processor 111 can be pre-programmed to accept more than one subscriber hand-set, as well as carrying out other functions described, infra.

Power supply 113 is a standard system for stepping down power from a 120 volt AC wall outlet to power levels appropriate for the electronics of the base station. Transmitter 103, receiver 104, modulator 108 and demodulator 107 are all standard types used in base stations of the conventional art, incorporated herein by reference.

Likewise, transmitter 101, receiver 102, modulator 105 and de-modulator 106 as well as vocoder 109 are all standard components directed to communication on cellular frequencies. The vocoder 109 is necessary if the base station 100 is to be used to relay voice channel communication to the cellular system. The power supply 112 permits operation on the cellular frequencies when appropriate, and can be used to cut off all cellular operations when deemed appropriate. Central processor 110 is programmed through I/O interface 114 so that appropriate instructions can be sent from base station 100 to the cellular system.

A key distinction between the present base station and conventional base stations is the addition of the cellular mode equipment to the normal cordless telephone equipment. In particular, it is the control of cellular operation with respect to an associated hand-set which constitutes one of the distinguishing features of the present invention. Based upon programming contained within central processor 110, base station 100 sends instructions to a cellular telephone system servicing the area in which the base station resides. The key instructions that are sent constitute a request for cellular call forwarding when a base station has established communication with an appropriate subscriber hand-set or portable station.

Communication between the base station and an appropriate hand-set is established in a manner well known in this art, and can be carried out using any number of handshake techniques and security levels. In addition to normal hand-set base station handshake techniques, the base station of the present invention also recognizes the PPN associated with the appropriate hand-set. Normally, this PPN is stored in both the hand-set and the base station, and is merely the cellular telephone number associated with the subscriber hand-set or portable station. The PPN information is accessed after the comparison process for the handshake is carried out in central processor 110, and incorporated into the instructions provided by control processor 111. Thus, the communications from transmitter 103 to the cellular telephone system will contain the PPN of the hand-set currently in communication with base station 100 and a request for cellular call forwarding, as well as the identity of that base station.

Consequently, the cellular system will recognize that calls to the PPN for that subscriber hand-set are to be routed over a landline system connected to interface 116 and identified by the landline telephone number of base station 100. To ensure greater reliability, the PPN and base station ID can be stored in a central location in the supporting communications network. A subscriber using the hand-set in communication with base station 100 according to the present invention is not required to pay cellular charges for incoming cellular telephone calls. The use of this control technique also provides a smooth transition from a cellular telephone mode to a cordless telephone mode for the subject subscriber associated with base station 100, without any modification to the cellular system or the landline telephone system. The only requirements are that the cellular telephone system have cellular call forwarding service available to a subscriber, and that the hand-set and base station be properly programmed.

If the instructions from the base station to the cellular telephone system requesting cellular call forwarding to the associated PPN is carried out only on cellular control channels, the vocoder 119 used for voice communication in base station 100 is not necessary. Consequently, this element can be eliminated, rendering a less expensive, more compact package. Normally there is no need for voice communication between base station 100 and the cellular telephone system since the request for cellular call forwarding can be carried out on cellular signaling channels rather than the cellular voice channels.

In another embodiment of the present invention, the base station does not have cellular equipment. Rather, the central processor 111 is programmed to send instructions to an appropriate hand-set in communication with the base station. These instructions control the cellular operation of the subject hand-set so that the hand-set itself sends the cellular call forwarding request to the cellular telephone system. As a result, the base station can be even less expensive and contained in an even more compact package.

Once the cellular call forwarding request has been sent to the cellular telephone system, all calls directed to the subject PPN will come in over the landline to which interface 116 is connected. Normally such a connection is carried out using a regular telephone jack (RJ-11) inside a residence or an office. Once the cellular call forwarding instruction is sent, the base station sends instructions to the hand-set to cease any cellular operations. Thus, there is no chance of inadvertent initiation of expensive cellular operation. This condition will prevail in the hand-set as long as the hand-set is within communication range of base station 100. It is noted that the present invention is not limited to the aforementioned operation since the programmability of the central processors 111, 110 permit a great deal of flexibility in the operation of the cordless telephone base station.

Such programming can include selection of default operation. For example, should the landline become unavailable for a predetermined period of time, the base station can cancel the cellular call forwarding instruction to permit cellular operation with the associated hand-set. Once the landline becomes available again, the base station can resend a request for cellular call forwarding for the PPN associated with the subject hand-set. The user of the hand-set will also have the option of entering a pass word (either through the base station I/O interface 115 or through the hand-set key board; not shown) to manually override all default actions of the system. As a result, a user can attach and detach PPN calls from the landline system, selecting those calls which he wishes to handle via cellular communications, and those calls he wishes to handle via the landline system. Using the programmable features of the base station and the hand-set, a user can also choose the circumstances under which hand-set operation will be detached from landline service, and default to cellular operation, or even permit calls to be routed to a voice mail box if the subscriber does not wish to receive cellular telephone calls.

Figure 2:
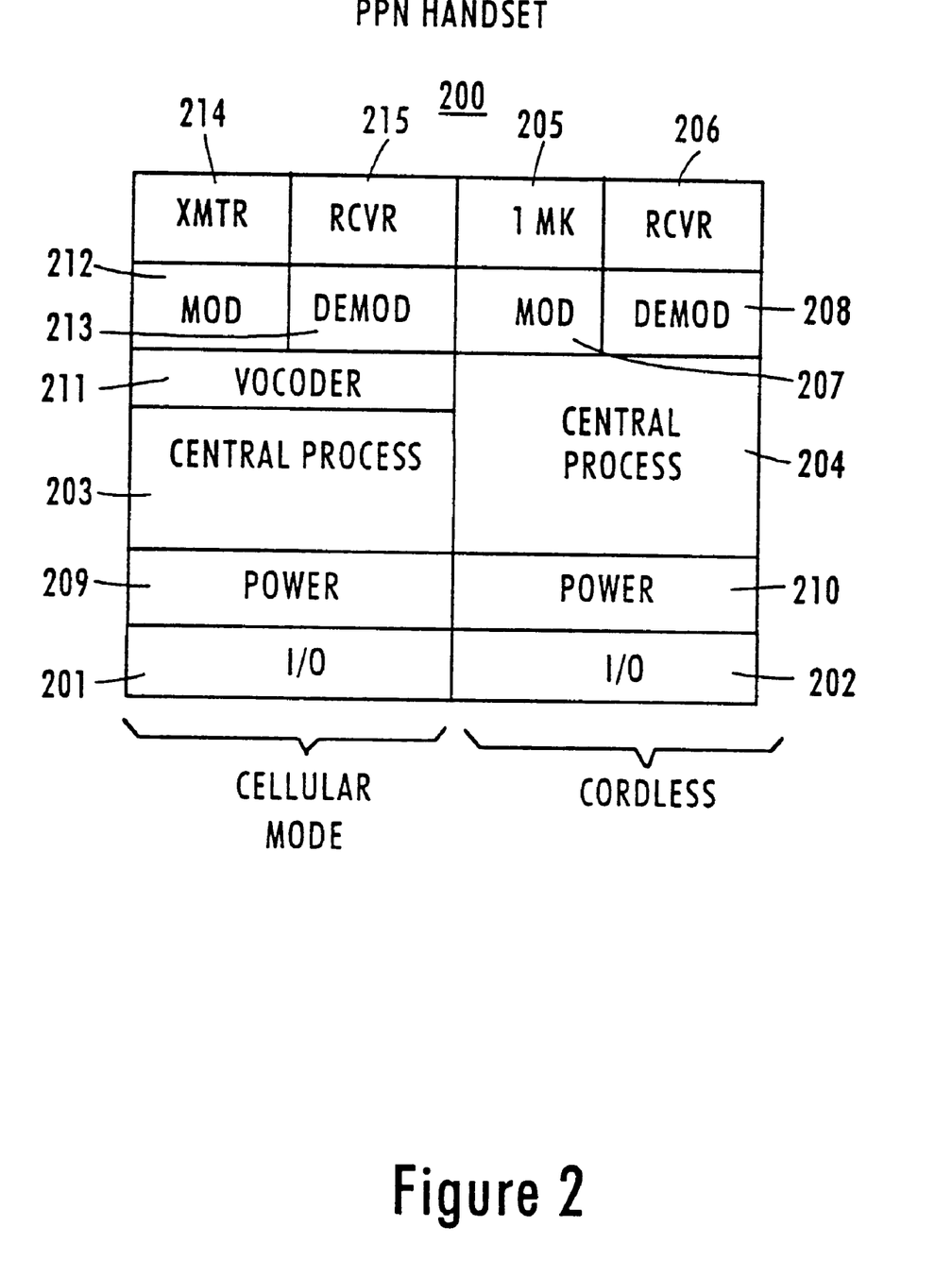
FIG. 2 is a block diagram representation of a portable subscriber station to hand-set used to carry out the personal communication service of the present invention.

The programmability of hand-set 200 depicted by the block diagram of FIG. 2 permits many of the operations that are normally programmed into the base station 100 via one of the I/O interfaces to be carried out using the hand-set. Such programming is carried out using a keyboard through I/O interfaces 201, 202. As a result, central processors 203 (for cellular operation) and 204 (for cordless operation) are easily programmed. Since hand-set 200 is in communication with base station 100 via transmitter 205 and receiver 206, the central processors 110, 111 of the base station can be programmed from the hand-set 200. This programming can be accomplished over predetermined control channels and need not tie up voice communication channels controlled by modulator 207 and de-modulator 208. These techniques are in general carried out in a manner well known in the conventional art, and require no further elaboration here other than the description of how the conventional art interfaces with the features of the present invention.

Power supplies 209 and 210 are the same as those well known in the conventional art, and can be used to efficiently close down cellular mode operations while still maintaining power for the cordless telephone operations. Cordless transmission capability can be stopped by 'powering-down' the output of the power supply to allow only cordless receiving operation. This can also be done in the base station 100. Generally, the power supplies 209 and 210 are constituted by batteries that are rechargeable when placed in a cradle associated with base station 100 or in another type of dedicated battery charger, as is well known in the conventional art.

Unlike vocoder 109 in base station 100, vocoder 211 is necessary for cellular voice channel communication via modulator 212, de-modulator 213, transmitter 214 and receiver 215. These elements are all well known in the conventional art and operate according to the examples previously incorporated herein by reference.

A key distinction between the hand-set 200 of the present invention and those known in the conventional art resides in the operation of that hand-set as programmed into processors 203, 204. As previously stated, the equipment handling the cellular mode of operation is closed down upon instruction from base station 100 once the base station has requested cellular call forwarding for the PPN of the hand-set 200. However, the hand-set continues to monitor the existence of communication between it and the base station 100. Once the hand-set 200 determines that such communication no longer exists (based upon programming in central processor 204), the hand-set automatically reactivates the cellular mode function and transmits an order to the cellular telephone system cancelling the original cellular call forwarding request. The criteria used to determine when communication between the portable subscriber station or hand-set 200 and the base station 100 has occurred can be determined in a number of different ways well known in the conventional art. As an option, the hand-set can be provided with the capability of generating an audible tone indicating that a user is reaching the limit of base station coverage.

Normally, a hand-set is in the "home" zone when the hand-set can detect the base station's paging signals. The hand-set usually responds to any paging messages it receives from the base station and a conventional handshake operation is carried out. As soon as the base station recognizes that an authorized hand-set has entered the "home" zone, the base station sends a call forwarding activation message to the cellular network. In the present invention, the base station normally does not determine when a hand-set has left the "home" zone within the range of the base station. Rather, this function is left to the subscriber hand-set 200. A subscriber can program parameters such as time delay into the hand-set so that a determination can be made when the hand-set 200 should reactivate the cellular mode.

Although described principally as "handsets", the mobile communication units used in the Personal Communication Service (PCS) can take many forms. The mobile communication unit could take the form of a vehicle mounted unit similar to existing mobile telephones. Also, the mobile communication units might include other communication devices compatible with the system, with or without incorporating standard telephone communication components. For example, the portable unit may comprise portable facsimile devices, laptop computers etc., one or more of which might incorporate a telephone handset. The portable subscriber communication unit, particularly when in the form of a handset, is configured in manner similar to the cordless handsets found in the prior art, except for the operations previously desired.

The hand-set 200 can be modified for a better range in reception using a detachable antenna. The base station can also be modified by placing its antenna on the roof or close to a window. As a result, the maximum range of communication between the hand-set 200 and the base station 100 can be extended to more than a mile, and perhaps up to three miles.

Because of the programmability of both the base station 100 and the hand-set 200, various calling features can be used with the present invention without additional modifications to the landline system or the cellular telephone system. For example, caller ID can be made available for display on the hand-set, if the existing telephone system can accommodate this feature. Further, due to the programmability of both the base station an the hand-set, either can be programmed to take different actions based upon the time of day or the day of the week. For example, between the hours of 9 a.m. and 5 p.m. on Monday through Friday, PPN calls will not be delivered through the landline. In the alternative, different default arrangements can be programmed so that cellular calls will not be completed but rather subjected to calling party pays options (if available in the existing landline telephone system) or routed to a voice mail box.

Figure 4:
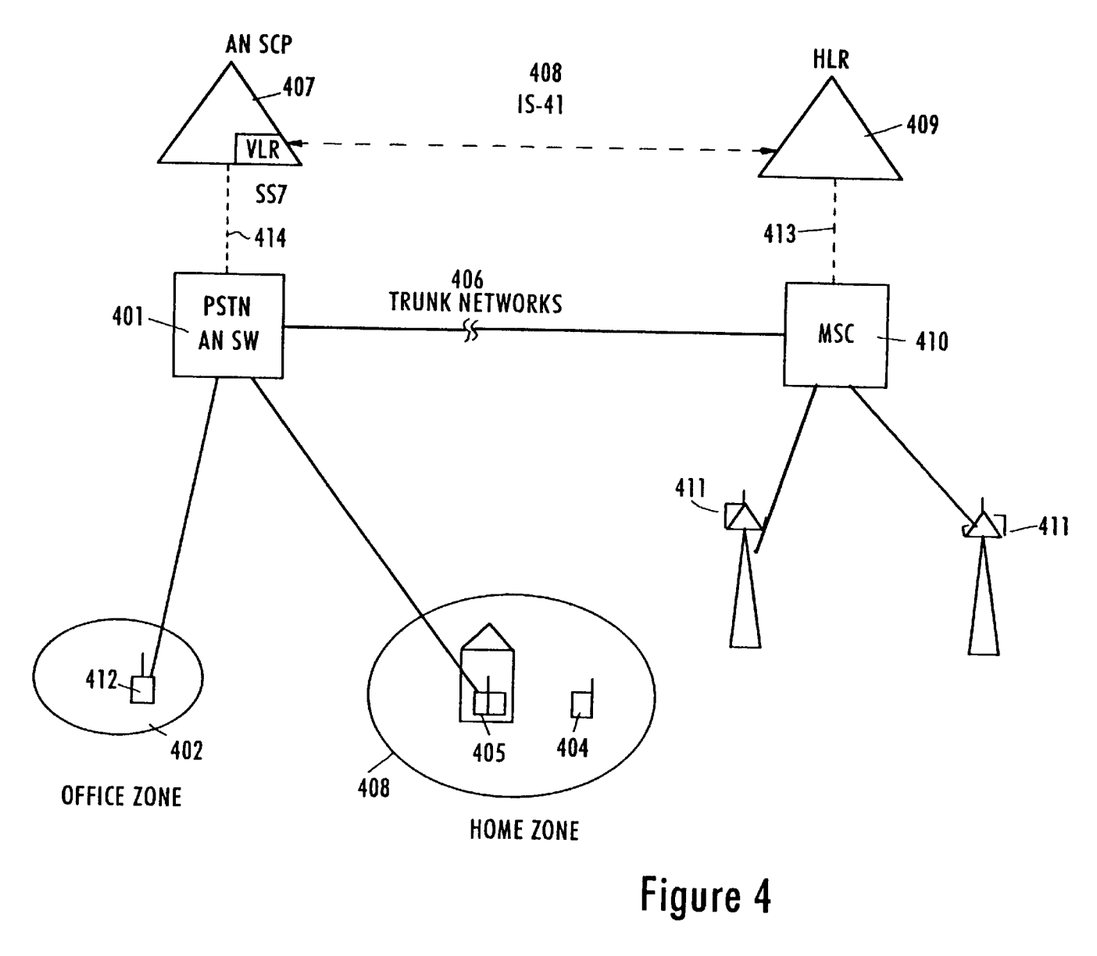
FIG. 4 illustrates an AIN used to support the personal communication service of the present invention.

If the base station 100 is configured as shown in FIG. 4, and either the base station or the hand-set are programmed so that priority calls are carried out in a cellular mode, then cellular voice communication in the "home" zone, i.e., in the range of base station 100, can be carried out through the base station cellular transceiver and relayed to the hand-set through the cellular mode, using the cellular equipment in the hand-set. This allows for better voice quality since the base station can use the higher powered (e.g., three watt) transceiver and extended antenna. In the alternative, the system can be programmed so that if certain parameters are met, communication through the cellular equipment of the base station will be relayed to the hand-set using the cordless telephone frequencies and equipment. For example, if the signal strength of the base station signal at the hand-set is at a predetermined level, cordless communication may be considered preferable to cellular communication in areas of extensive cellular telephone usage.

Once calls are active on both the landline and the PPN, the subscriber will have the ability to go back and forth between the two calls using the hand-set, and if desired, bridge the call together (through the base station) so that an effective three-way call can be established. This is possible due to the programmability of the base station 100. Thus, the subscriber can then detach the two calls and drop either or both of them. For example, a subscriber can communicate with the base station over cordless telephone frequencies, and talk to a first party via the landline interface 116. The subscriber can also communicate with a second party, via the cellular equipment in the base station. The information for both these calls can be processed by the two central processors 110 and 111 so that the subscriber can hear either or both and either of the two parties can be designated to hear either or both the subscriber and the other calling party.

The cellular network can forward all PPN calls to the landline number in an encrypted manner (e.g., still vocoded). The base station or hand-set will decode the call. This ensures that other phones attached to the landline will not be able to answer or eavesdrop on the PPN calls. Since security is of increasing concern in communications systems, the present invention can provide password protection for the default override, use of the cellular mode, use of a priority mode or access to the programming mode.

Should the subscriber be using the PPN hand-set for an active landline call when a PPN call arrives (through the cellular network) the base station provides the subscriber with a call waiting tone, and indicates that call bridging options are available. Thus, the subscriber can choose to put one call on hold while addressing the other or indicate that the second call is to be forwarded to a voice mail system if such an option exists in the servicing landline telephone network. Also, distinctive ringing can be programmed when an incoming call on a landline is a PPN call. This can be carried out in one of two ways, either the landline switch (SS7) recognizes forwarding calls and provides distinctive ringing, or the cellular network sends a message to the base station 100, notifying it of an immediately arriving incoming PPN call forwarded through the landline; at which point the base station provides the distinctive ringing.

A key advantage of the present invention is that no systems modifications are necessary in either the cellular telephone or landline telephone systems. The only system requirement is that cellular call forwarding be available. Every other aspect of the present invention is supplied by CPE.

Figure 3:
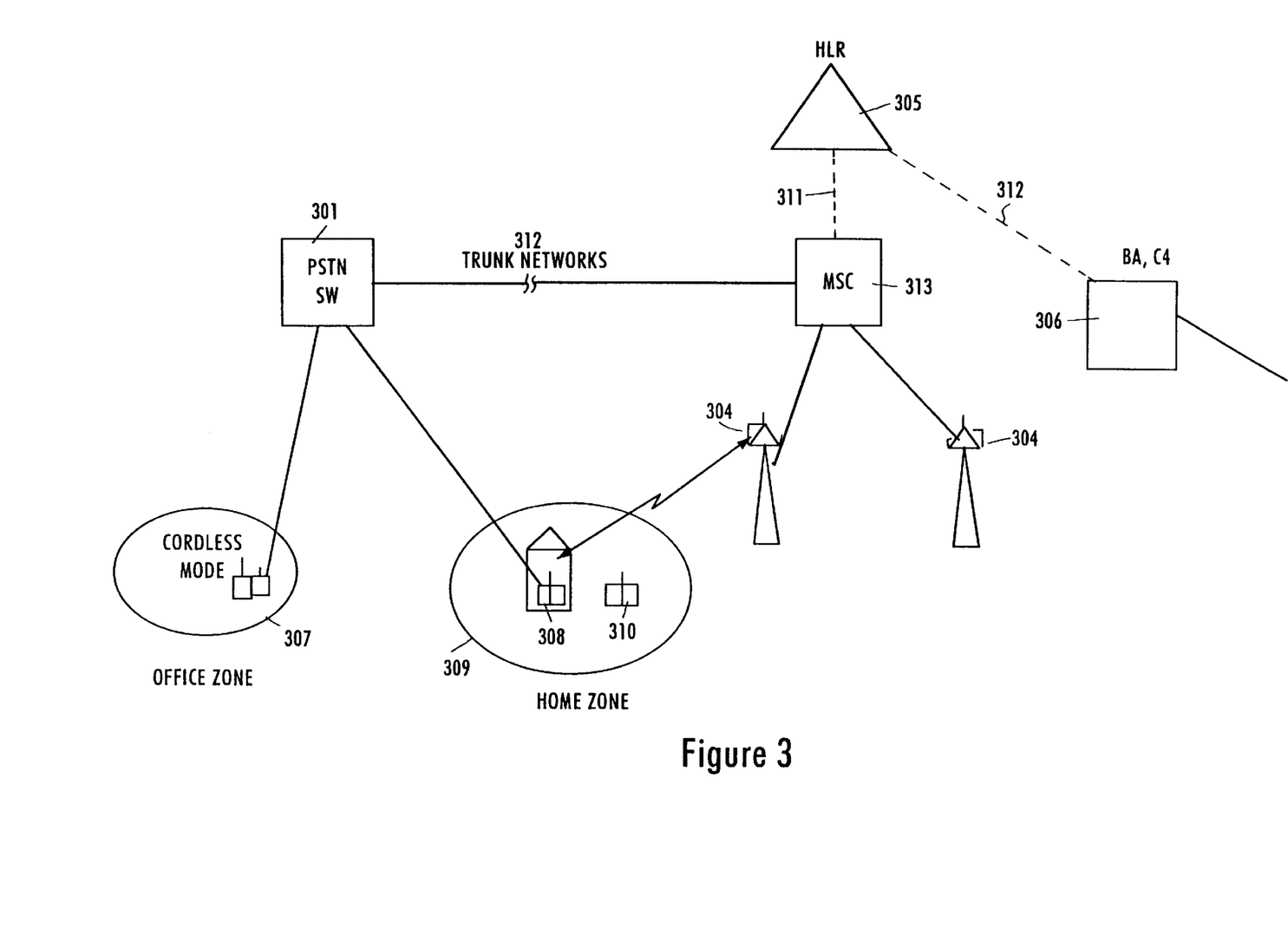
FIG. 3 illustrates a conventional landline telephone system and cellular telephone system used in support of the present invention.

FIG. 3 depicts a standard cellular telephone system coupled to a standard public switched telephone network 301 supporting the personal phone number service previously described. The base station 308 in "home" zone 309 is connected via landline to the public switched telephone network 301. If the cordless base station 308 has cellular capability, there is a radio link between the nearest base station 304 supported by the mobile switching center 303 of the cellular telephone system. As previously described, when a subscriber portable station or hand-set 310 comes within the "home" zone 309, base station 308 causes a request for cellular call forwarding to be transmitted to the cellular telephone system through base station 304 to mobile switching center 303. The location and PPN of subscriber station 310 is stored in a home location register 305, coupled to the mobile switching center via data lines 311. The home location register 305 keeps track of the location of "home" zone 309. When subscriber station 310 roams out of the "home" zone, a radio link is established with the nearest cellular base station 304. This location is transmitted through the mobile switching center 303 and stored in the home location register 305 so that incoming calls for the subscriber 310 can be routed to the correct base station to establish cellular communication.

The present invention can accommodate communication between the subscriber hand-set 310 and other base stations such as one controlling an office zone 307. When contact is made between the subscriber station 310 and the base station in office zone 307, a cellular communication link can be made as is normally done with the home base station. However, it is also possible that the location of subscriber 310 can be transmitted over the landline telephone system 301, through trunk networks 302 connecting the landline telephone switch and the mobile switching center 303. The location of the subscriber (i.e., at the office zone 307) is then stored in the home location register 305. Auxiliary storage centers such as 306 can be connected to the home location register 305 through data trunks 312. Such an arrangement also facilitates easy transmission of data from the public switched telephone network to the home location register since the necessity of transferring data from a telephone company switch through trunk networks and the mobile switching center 303 is eliminated.

The present invention can also be facilitated by an Advanced Intelligent Network (AIN) as illustrated in FIG. 4. A full description of the operation of a personal communication system that would accommodate the present invention is described in U.S. patent Ser. No. 07/845,924, previously incorporated herein by reference. As in the standard telephone landline system of FIG. 3, the base station 403 and the "home" zone 405 and 412 in office zone 402 are connected directly to the public switched telephone network via the distribution switch 401. Information regarding the PPN of subscriber station 404 is routed over data trunk networks 406 to the mobile switching center 410. In the alternative, a cellular radio link can be established between the base stations 403 and 402 to the nearest cellular base station 411, when appropriate.

The AIN provides a service control point (often known as an Integrated Service Control Point (ISCP) which can be used to contain a visiting location register, connected to the home location register 409 via IS-41 data trunk 408. This arrangement provides easy accommodation for roaming subscriber stations 404 which have left the home cellular telephone system and have entered the designated area of another cellular provider. The use of data trunks such as 414, 413 as well as IS-41 data trunk 408 provide communication between different cellular telephone systems within the context of the AIN. Data transmission is controlled using the service control point 407 so that PPN calls directed to a subscriber indicated at home location register 409 can be routed to the proper cellular telephone system and base stations based upon data stored in a visitor location register associated with another cellular telephone system.

It is noted that the visitor location register can also be used to keep track of subscriber stations that have left the respective home zones 405, and have temporarily relocated in other zones such as office zone 402. Data regarding such relocation can be sent to the visitor location register via the public switched telephone network switch 401 and data link 414. Using this technique, trunk networks 406 are not burdened nor is the mobile switching center 410 required to handle this information. However, such information is readily available to the home location register via IS-41 data link 408. Thus, the AIN facilitates more efficient data and information handling in the operation of the present invention.

It is noted that the aforementioned descriptions are provided by way of example only, and do not limit the present invention other than as recited in the following claims. Thus, the present invention encompasses all variations, permutations, modifications and additions that would be apparent to one skilled in this art once the present invention is disclosed in accordance with the following claims.

I claim:

1. A cordless telephone base station comprising:
    (a) a connection to a line of a landline telephone system, the line having a directory number assigned thereto;
    (b) a first radio telephone transceiver for direct coupling to the connection and arranged for operation on cordless telephone frequencies;
    (c) a second radio telephone transceiver for coupling to a cellular telephone system and for requesting cellular call forwarding;
    (d) means for recognizing an encoded number associated with a subscriber portable station indicative of compatibility with said cordless telephone base station; and
    (e) means for correlating a cellular telephone number different from the encoded number with said subscriber portable station, the cellular call forwarding request indicating that calls to the cellular telephone number be forwarded to the directory number,
    wherein the subscriber portable station comprises a cellular telephone transceiver for operations in a cellular mode and a cordless telephone transceiver for operations in a cordless mode, the subscriber portable station providing direct communication with the cellular telephone system in the cellular mode, the cellular mode being deactivated when the subscriber portable station comes within communication range of the cordless telephone base station.

2. A method for receiving incoming cellular telephone calls over a cordless telephone frequency, comprising the steps of:
    detecting when a portable station having a cellular telephone transceiver and a cordless telephone transceiver is within communication range of an associated cordless telephone base station, the portable station having an assigned cellular telephone number, wherein the cordless telephone base station is coupled to a land line, the land line having a directory number different from an encoded number associated with the subscriber portable station indicative of compatibility with the cordless telephone base station, the cordless telephone base station comprising a base station cellular transceiver and a base station cordless transceiver, the portable station being capable of directly communicating with the cellular telephone network via the cellular telephone transceiver;
    transmitting a cellular call forwarding request related to said portable station to a cellular telephone network when the portable station comes within range of the associated cordless telephone base station;
    activating call forwarding at the cellular telephone network for incoming calls addressed to the portable station in response to the cellular call forwarding request;
    forwarding an incoming call addressed to the cellular telephone number of the portable station from the cellular telephone network to the directory number of the cordless telephone base station over a landline telephone system;
    transmitting the incoming call from the cordless telephone base station over the cordless telephone frequency; and
    receiving the incoming call at the portable station on the cordless telephone frequency.

3. The method of claim 2, including the step of:
    transmitting the cellular call forwarding request from the cordless base station to the cellular telephone network.

4. The method of claim 2, including the steps of:
    instructing the portable station to send the cellular call forwarding request, and
    transmitting the cellular call forwarding request from the portable station to the cellular telephone network in response to the instruction.

5. The method of claim 2, including the further steps of:
    monitoring the availability of the landline telephone system, at the cordless telephone base station, and
    if the landline telephone system becomes unavailable for a predetermined period of time, canceling the cellular call forwarding request to permit cellular operation with the portable station.

6. The method of claim 5, including the further step of:
    retransmitting a request for cellular call forwarding from the cordless base station to the cellular telephone network when the landline telephone system becomes available again.

7. The method of claim 2, including the further step of:
    increasing the cordless telephone frequency range of the portable station by using a detachable antenna.

8. The method of claim 2, including the further step of:
    increasing the cordless telephone frequency range of the cordless telephone base station by placing its antenna on a roof of a building or close to one of the building windows.

9. The method of claim 2, including the further step of:
    generating an audible tone when the portable station reaches the limit of cordless base station coverage.

10. The method of claim 2, wherein the step of receiving the incoming call includes:
    receiving cellular phone calls on the cordless frequency while the portable station is within communication range of the cordless telephone base station only during specified periods of time.

11. The method of claim 10, wherein
    said specified periods of time are days of a month or times of a day.

12. The method of claim 2, including the further step of:
    providing a distinctive ringing tone for a forwarded call from the cellular telephone network.

13. The method of claim 2, including the further steps of:
    overriding cordless frequency operation while the portable station is within range of the cordless telephone base station by selectively deactivating call forwarding; and
    defaulting to cellular operation.

14. The method of claim 2, wherein the step of receiving the incoming cellular call comprises the steps of:
    programming default actions for the incoming cellular call addressed to the portable station into the portable station;
    entering a pass word for overriding the default actions of the portable station; and
    selectively receiving the incoming cellular call addressed to the portable station over cellular or cordless frequencies while the portable station is within cordless frequency range of the cordless telephone base station.

* * * * *